(12) United States Patent
Spletzer et al.

(10) Patent No.: US 6,453,684 B1
(45) Date of Patent: *Sep. 24, 2002

(54) METHOD AND APPARATUS FOR EXTRACTING WATER FROM AIR

(75) Inventors: Barry L. Spletzer; Diane Schafer Callow; Lisa C. Marron; Jonathan R. Salton, all of Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 3 days.

This patent is subject to a terminal disclaimer.

(21) Appl. No.: 09/804,709

(22) Filed: Mar. 12, 2001

(51) Int. Cl.[7] .................................................. F25D 17/06
(52) U.S. Cl. .............................................. 62/93; 62/271
(58) Field of Search ............................ 62/93, 271, 94, 62/468; 95/209, 231

(56) References Cited

U.S. PATENT DOCUMENTS

| | | | |
|---|---|---|---|
| 4,027,993 A | | 6/1977 | Wolff |
| 4,050,262 A | * | 9/1977 | Mehnert ........................ 62/160 |
| 4,351,651 A | * | 9/1982 | Courneya ....................... 55/210 |
| 4,665,715 A | * | 5/1987 | Signoret ........................ 62/402 |
| 5,233,843 A | * | 8/1993 | Clarke ........................... 62/271 |
| 5,259,203 A | * | 11/1993 | Engel et al. .................... 62/150 |
| 5,290,959 A | * | 3/1994 | Rice ............................. 554/11 |
| 5,547,341 A | | 8/1996 | Amin |
| 5,765,387 A | | 6/1998 | Amin |
| 5,857,344 A | * | 1/1999 | Rosenthal ....................... 62/93 |
| 6,230,503 B1 | * | 5/2001 | Spletzer ......................... 62/93 |

\* cited by examiner

*Primary Examiner*—William C. Doerrler
(74) *Attorney, Agent, or Firm*—V. Gerald Grafe

(57) ABSTRACT

The present invention provides a method and apparatus for extracting liquid water from moist air using minimal energy input. The method comprises compressing moist air under conditions that foster the condensation of liquid water. The air can be decompressed under conditions that do not foster the vaporization of the condensate. The decompressed, dried air can be exchanged for a fresh charge of moist air and the process repeated. The liquid condensate can be removed for use. The apparatus can comprise a compression chamber having a variable internal volume. An intake port allows moist air into the compression chamber. An exhaust port allows dried air out of the compression chamber. A condensation device fosters condensation at the desired conditions. A condensate removal port allows liquid water to be removed.

29 Claims, 6 Drawing Sheets

METHOD AND APPARATUS FOR EXTRACTING WATER FROM AIR

PRIORITY CLAIM

This continuation-in-part application claims priority to application Ser. No. 09/439,105 "Method and Apparatus for Extracting Water from Air", filed Nov. 29, 1999, incorporated herein by reference.

This invention was made with Government support under Contract DE-AC04-94AL85000 awarded by the U.S. Department of Energy. The Government has certain rights in the invention.

BACKGROUND OF THE INVENTION

This invention relates to the field of water-air interactions, specifically the extraction of water from moist air (a mixture of air and water vapor).

Water, especially potable water, is a constant need. Obtaining potable water is a threshold requirement for most human and animal activity. Obtaining potable water can be especially problematic in arid areas. Tremendous effort and expense currently go to drilling wells, building water transport systems, and purifying and desalinating water.

Water is conventionally obtained by purifying existing liquid water. Reverse osmosis, distillation, and filtration are used to purify contaminated water. Desalination is used to produce potable water from sea water. These approaches can be energy-intensive, and require the presence of liquid water as the starting material.

If liquid water is not available, then purification processes are not applicable. Dehumidification by refrigeration can be used to produce liquid water from moist air. Conventional refrigeration processes are very energy-intensive, however. Further, conventional refrigeration processes can involve large and complex machines. Consequently, conventional refrigeration processes are generally not economical for production of potable water.

Accordingly, there is a need for a method and apparatus for obtaining potable water from moist air that does not require the expense or complexity of conventional refrigeration processes.

SUMMARY OF THE INVENTION

The present invention provides a method and apparatus for extracting liquid water from moist air using minimal energy input. The method comprises compressing moist air under conditions that foster the condensation of liquid water (i.e., to a pressure where the water originally in the air is more than that representing a relative humidity of 1.0 at the increased pressure). The liquid condensate can be removed for use. Some of the energy required to compress the air can be recovered by allowing the remaining dry air to expand. The decompressed, dried air can be exchanged for a fresh charge of moist air and the process repeated.

The apparatus comprises a compression chamber having a variable internal volume. An intake port allows moist air into the compression chamber. An exhaust port allows dried air out of the compression chamber. A condensation device fosters condensation at the desired conditions. A condensate removal port allows liquid water to be removed.

Advantages and novel features will become apparent to those skilled in the art upon examination of the following description or may be learned by practice of the invention. The objects and advantages of the invention may be realized and attained by means of the instrumentalities and combinations particularly pointed out in the appended claims.

DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
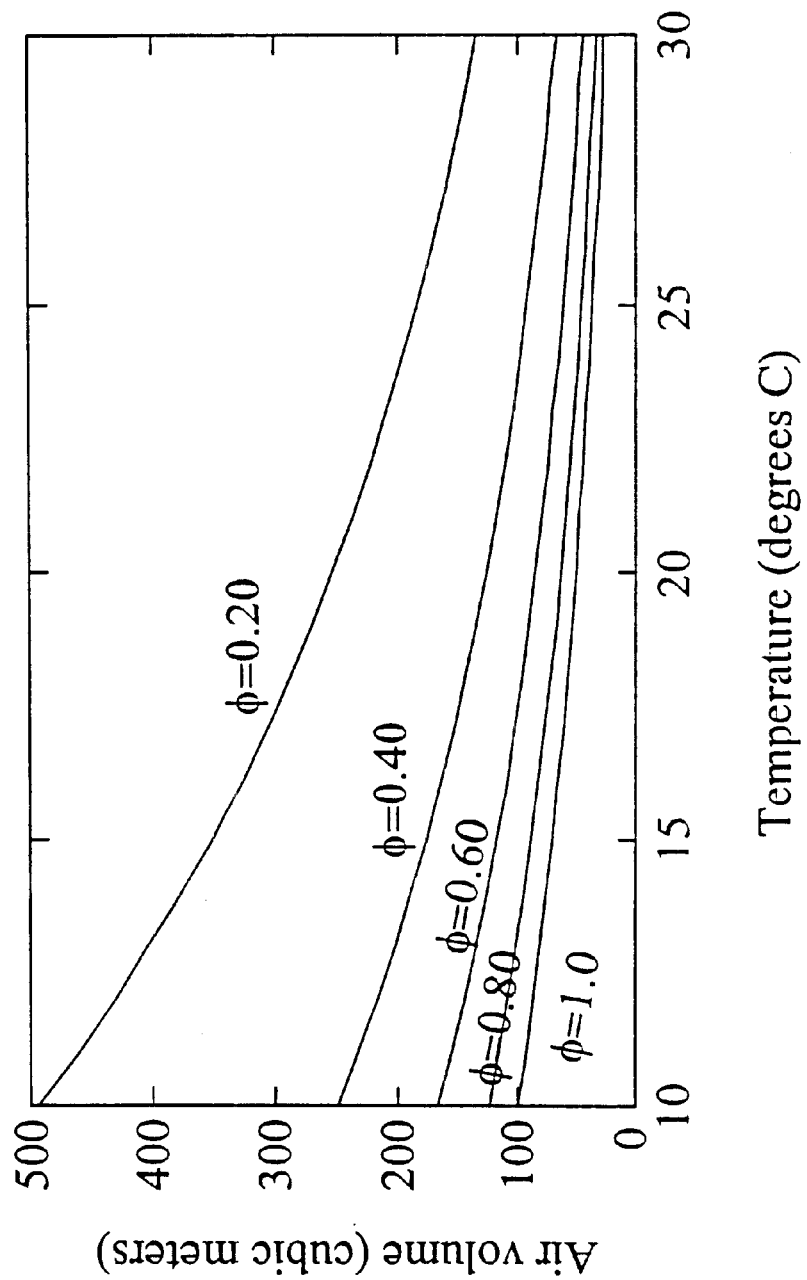
FIG. 1 is a plot of representative values over normal environmental conditions.

The present invention provides a method and apparatus for extracting liquid water from moist air using minimal energy input. The method comprises compressing moist air under conditions that foster the condensation of liquid water (i.e., to a pressure where the water originally in the air is more than that representing a relative humidity of 1.0 at the increased pressure). The liquid condensate can be removed for use. Some of the energy required to compress the air can be recovered by allowing the remaining dry air to expand. The decompressed, dried air can be exchanged for a fresh charge of moist air and the process repeated.

The present invention takes advantage of several thermodynamic principles:

1. As moist air is compressed, water in the air condenses into liquid water (provided the temperature increase is not too great).
2. As water condenses, it liberates the energy originally required to evaporate the water into the air.
3. Liberation of the vaporization energy raises the temperature of the air.
4. The energy required to compress the air can be recovered during subsequent expansion, plus additional mechanical energy resulting from the increased air temperature can be recovered.

The four principles characterize the thermodynamic cycle of the present invention. They allow liquid water to be extracted from air, and provide a simple way to convert the released heat of vaporization into mechanical work to assist in operating the extraction system.

The description below introduces principles and terms, describes the method of the present invention including the efficiency and tradeoffs involved, and describes an apparatus suitable for practice of the method.

Psychrometric Principles

Moist air is a mixture of air and water vapor. Moist air and its components (dry air and water vapor) behave as an ideal gas until condensation occurs. Consequently, the law of partial pressures is applicable to much of the analysis of the present invention. Under the law of partial pressures each component of a mixture behaves as though it occupies the entire volume.

The amount of water vapor contained in air is commonly expressed as the percent relative humidity. The percent relative humidity is defined as the percentage of water vapor in the air compared to the maximum amount that the air can hold at that temperature and pressure. A more convenient expression for analysis is the use a variable φ that ranges from 0 to 1 rather than a percentage. By the law of partial pressures, the partial pressure of the water vapor (or vapor pressure $p_v$) is the product of the relative humidity and the saturation pressure $p_{sat}$ of water at the air temperature, as shown in equation 1.

$$p_v = p_{sat} \phi \qquad 1$$

Since partial pressure of the vapor is determined by the molar concentration of the vapor, the ratio of the molecular weights of air $M_a$ and water $M_v$ is a useful factor in determining the available water. This constant ratio is defined in equation 2.

$$\mu = \frac{M_v}{M_a} = 0.622 \qquad 2$$

The saturation pressure of water as a function of temperature will be an important parameter in analyzing the efficiency of the method of water extraction from air. Table 1 is a table of saturation pressures.

TABLE 1

| Temperature (C.) | Saturation Pressure (bars) |
| --- | --- |
| 0 | 0.00611 |
| 5 | 0.00872 |
| 10 | 0.01228 |
| 15 | 0.01705 |
| 20 | 0.02339 |
| 25 | 0.03169 |
| 30 | 0.04246 |
| 35 | 0.05628 |
| 40 | 0.07384 |
| 45 | 0.09593 |
| 50 | 0.1235 |

The humidity ratio or specific humidity Ω is defined as the ratio of the mass of water vapor to the mass of dry air. By the law of partial pressures this is given in equation 3.

$$\omega = \mu \frac{p_v}{p_a} \qquad 3$$

The variable $p_a$ is the partial pressure of dry air. Since the moisture content in the air at ordinary conditions is about one percent, using the total air pressure rather than the dry air pressure will result in insignificant error. At elevated temperatures this is not necessarily true. For the purposes of the analysis, the dry air pressure and the total air pressure are used interchangeably.

Method of Extracting Water from the Atmosphere

Condensation of water vapor from the atmosphere begins when the vapor pressure reaches the saturation pressure of the water. This corresponds to a relative humidity of 1.0. Any excess water (water in excess of a relative humidity of 1.0) will condense. The amount of water condensed depends on the initial and final conditions of the atmosphere. At the end of condensation, the relative humidity of the atmosphere will be 1.0. The amount of water condensed as a fraction of the amount of air processed is the difference in initial and final specific humidity, as shown in equation 4.

$$\lambda_w = \omega_i - \omega_f = \mu \left[ \frac{p_v}{p_a} - \frac{p_{sat}(T)}{p_a} \right] = \mu \left[ \frac{\phi_i p_{sat}(T_i)}{p_i} - \frac{p_{sat}(T_f)}{p_f} \right] \qquad 4$$

The amount of water condensed depends on the initial conditions of humidity, temperature, and pressure (subscripted i in equation 4) and the final conditions of temperature and pressure (subscripted f in equation 4).

Conventional dehumidifiers extract water from air by cooling alone. The initial and final pressures are equal but the changing saturation pressure with temperature causes condensation. The vapor pressure remains constant while the saturation pressure drops with temperature. Such a system requires significant refrigeration since it must cool the air and remove the heat of vaporization of the condensing liquid.

Equation 4 makes evident another way to condense available water vapor. Minimizing the ratio of saturation pressure at final temperature to final pressure maximizes condensation. This can be done by lowering the saturation pressure as in a conventional dehumidifier, and by raising the final pressure. The method of the present invention relies on raising the final pressure to allow condensation without requiring refrigeration. Heat can be removed from the moist air being compressed to further foster condensation. Condensation can be further encouraged by reducing the temperature of the moist air during compression, although requiring refrigeration can greatly increase the energy required to extract water.

Reliance on raising the final pressure leads to a practical water extraction method. Consider how much water is potentially available from the atmosphere. At nominal initial conditions of 25 degrees C. and 40 percent relative humidity the saturation pressure of 0.0317 bar and the specific humidity is 0.0078. The specific volume of air at this temperature is 0.708 m³/kg. Accordingly, 92 m³ of air contains 1 kg of water at these conditions. For comparison, a 20 cc engine operating at 10,000 rpm (as in conventional radio controlled airplanes) can process about 300 m³ per day. The amount of available water in air varies greatly with temperature and humidity. FIG. 1 is a plot of representative values over normal environmental conditions.

The method of the present invention requires less energy to extract water than does refrigeration. Consider the amount of energy required to compress the moist air. Since the objective is condensation, and lower temperatures allow more ready condensation, non-adiabatic compression is desirable. Adiabatic compression can result in significant temperature increases, to the extreme that condensation will not occur. A bound on the work required can be evaluated by considering isothermal compression and applying the ideal gas law which states that, for isothermal conditions, the pressure-volume product is constant. The analysis below provides an estimate of the compression work required using a simplifying assumption of isothermal compression; the invention does not require isothermal operation. The pressure for any given volume can be related to the initial pressure and volume by equation 5.

$$p = \frac{p_i v_i}{v} \qquad 5$$

The work required for compression is given by equation 6.

$$w_a = -\int_{v_i}^{v_f} p\, dv = -\int_{v_i}^{v_f} \frac{p_i v_i}{v} dv = p_i v_i \ln\left(\frac{v_i}{v_f}\right) = p_i v_i \ln\left(\frac{p_f}{p_i}\right) \qquad 6$$

Defining v as specific volume (the reciprocal of density) the compression work $w_a$ is the energy per unit mass of air required. Combining this with the water extraction relationship allows determination of the compression energy required per unit mass of water. The water extraction relationship can be simplified because the initial and final temperatures are equal. The work is then given by equation 7.

$$w_w = -\frac{p_i v_i}{\mu p_{sat}\left(\frac{\phi}{p_i} - \frac{1}{p_f}\right)} \ln\left(\frac{p_f}{p_i}\right) \qquad 7$$

Introducing a variable ρ to represent the compression ratio or the pressure ratio can simplify the relationship. The pressure ratio is the same as the compression ratio since the process is isothermal. The compression work is then given by equation 8.

$$w_w = -\frac{p_i^2 v_i}{\mu p_{sat}\left(\phi - \frac{1}{\rho}\right)} \ln(\rho) \qquad 8$$

For a given atmospheric pressure and temperature, the compression work is a function of the relative humidity and the pressure ratio. Further, the compression work is minimized with respect to the water condensed with the condition of equation 9 is met.

$$\phi = \frac{\ln(\rho) + 1}{\rho} \qquad 9$$

Equation 9 shows the required humidity corresponding to a pressure ratio. Substituting equation 9 into the work relationship gives the minimum required work for a given pressure ratio as in equation 10.

$$w_{min} = \frac{v_i p_i^2}{\mu p_{sat}} \rho \qquad 10$$

For example conditions of 25 degrees C. and 40 percent humidity, the compression ratio for minimum work is 7.5 and the specific work is 22 MJ/kg of water condensed. This seems large in comparison to the heat of vaporization of water (2.5 MJ/kg), but is offset by several considerations. Reversibility of isothermal compression means that the mechanical work of compression can be recovered in expansion. Friction and flow losses will consume some of the compression energy. With a 90 percent efficient compressor, the amount of energy lost equals the heat vaporization of water. However, when the water condenses, the heat vaporization energy is released, having the potential to use the heat vaporization energy to generate mechanical work (other thermodynamic cycles generate work from heated air, e.g. Otto, Brayton, Deisel). One view of the method of the present invention is as evaporative cooling in reverse: instead of hot dry air plus water producing cool moist air as in evaporative cooling, the present invention takes cool moist air and produces hot dry air plus water.

Thermodynamic Analysis

An idealized thermodynamic cycle of the present invention can be difficult to achieve in practice, but aids in understanding the principles underlying the present invention. The complete thermodynamic cycle can be viewed as four distinct steps:

1. compression of atmospheric air to a pressure and temperature where the quantity of water in the air is more than the quantity making a relative humidity of 1.0,
2. condensation of water vapor to maintain a humidity of 1.0,
3. removal of condensate and isothermal expansion of the remaining air, and
4. exhaust of dried air and recharge with moist air.

For a closed thermodynamic cycle the fourth step is the equivalent of evaporating the condensed moisture back into the air. In practice this is an open cycle where dry air is exhausted and moist air introduced. The heat of vaporization extracted during the rest of the cycle is provided by solar evaporation of water into the atmosphere outside the water extraction system.

The cycle can be drawn as a classic thermodynamic cycle. Cycle diagrams are required for each component (air and water).

Ideal Thermodynamic Cycle for Dry Air

Figure 2:
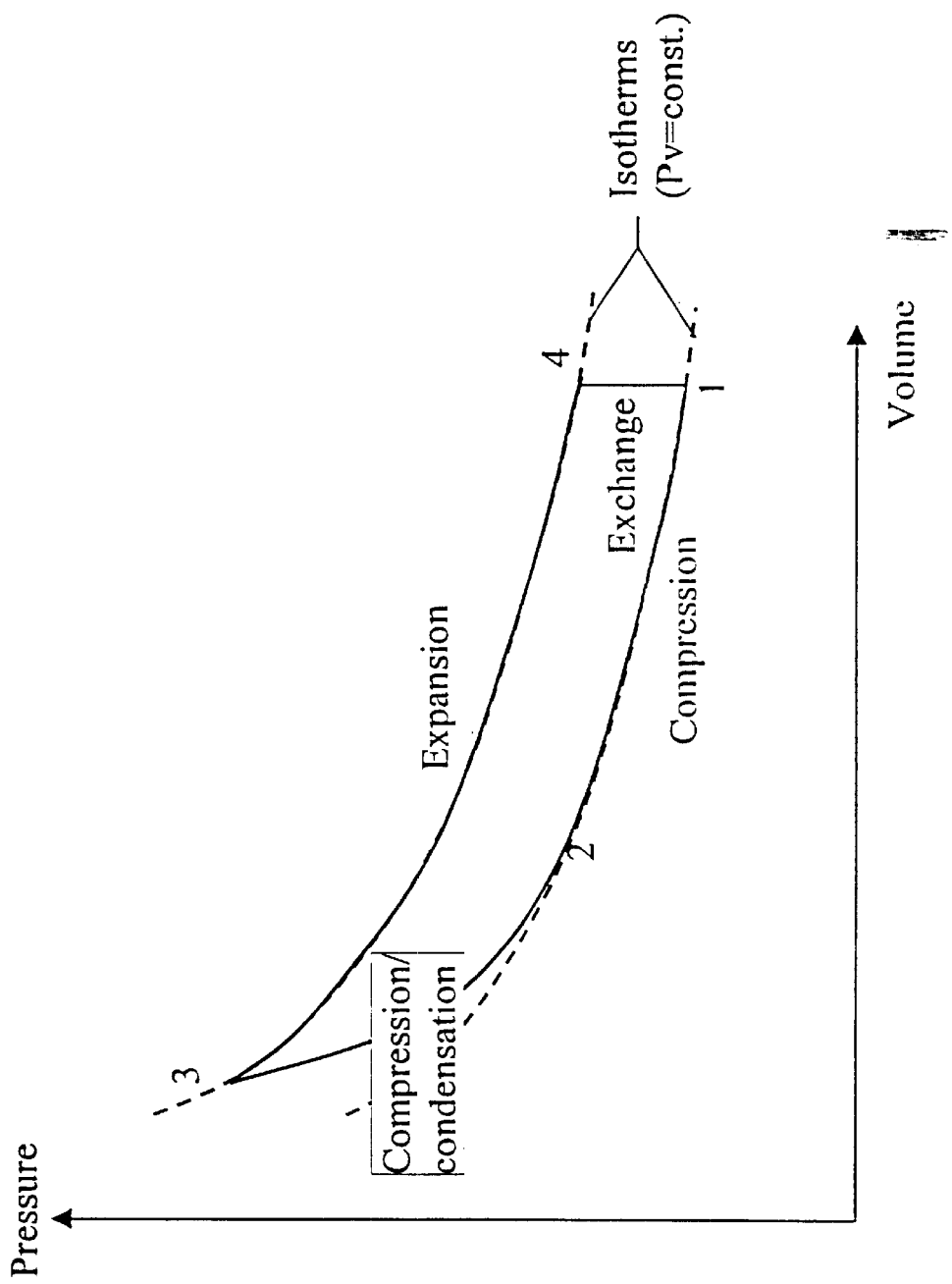
FIG. 2 is a graph of a thermodynamic cycle for dry air in a method according to the present invention.

FIG. 2 is a graph of a thermodynamic cycle for the dry air. The cycle begins as condition 1 with the air at ambient pressure and density. The dotted line extending towards condition 2 is the isotherm for ambient conditions. Isothermal compression and expansion are shown for ease of illustration and analysis. Isothermal operation is not required, however, so long as the compression ends at a temperature/pressure condition where the original mass of water exceeds that required for a relative humidity of 1. At condition 2 the dry air begins to deviate from isothermal conditions. This is due to condensation, which raises the temperature by releasing the heat of vaporization into the air. Compression continues, causing more condensation and further increasing temperature until condition 3 is reached. At this point the liquid water is removed from the system and the warm dried air begins to expand. Expansion occurs along the upper isothermal to condition 4. At condition 4 the expanded air is exhausted and a new charge of moist ambient air is introduced causing the cycle to return to condition 1. Because of the heating caused during the compression/condensation portion of the cycle there is a net area within the loop corresponding to the amount of available work.

Ideal Thermodynamic Cycle for Moisture

Figure 3:
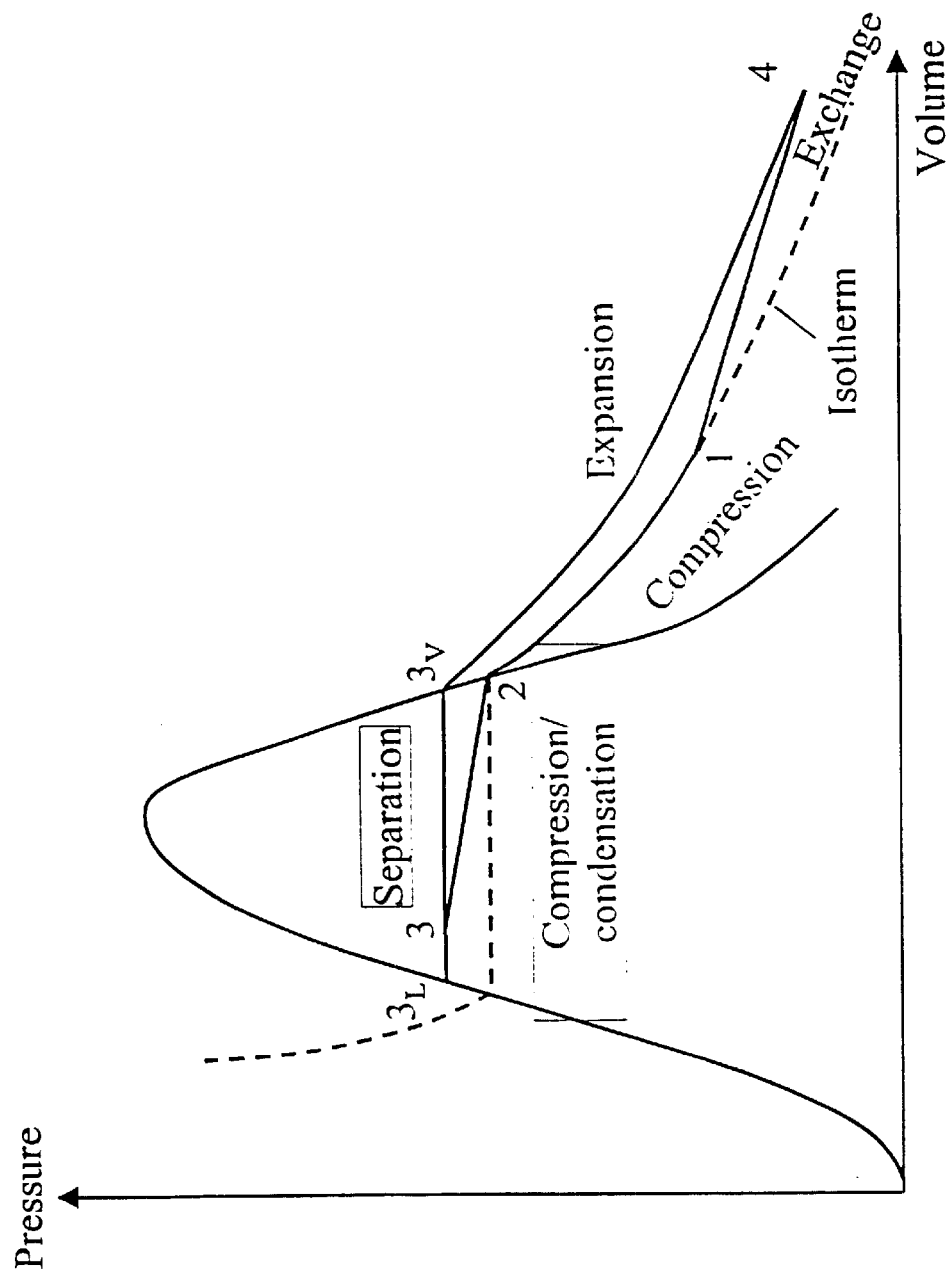
FIG. 3 is a graph of a thermodynamic cycle for moisture in a method according to the present invention.

FIG. 3 is a graph of a thermodynamic cycle for the moisture. The ambient temperature, specific volume and vapor pressure of the moisture are at condition 1. Isothermal compression proceeds to condition 2 where the isotherm enters the liquid-vapor region of the phase diagram—the point at which condensation begins. Isothermal compression and expansion are shown for ease of illustration and analysis. Isothermal operation is not required, however, so long as the compression ends at a temperature/pressure condition where the original mass of water exceeds that required for a relative humidity of 1. From condition 2 to condition 3 the condensation and compression proceed and the temperature increases due to the release of the heat of vaporization. The pressure increases with decreasing specific volume. Liquid water can be extracted at condition 3, represented on the diagram as a split in the cycle. Consequently, there is liquid as condition 3L and vapor at condition 3V. The extracted liquid does not appear further in the cycle. The remaining vapor at condition 3V has a much larger specific volume (lower density) that the liquid-vapor mixture. The saturated vapor is then expanded isothermally with the expanding dry air. The result of the expansion is condition 4 with lower vapor pressure and greater specific volume than the initial conditions. The greater specific volume of caused by the earlier removal of the liquid water so that a smaller quantity of water vapor now occupies the same initial volume. Finally, the remaining water vapor is exhausted with the dried air and a fresh charge of ambient air is introduced, returning the cycle to condition 1.

Work Required for the Cycle

Treating the dry air and moisture separately according to the law of partial pressures can simplify the analysis of work during the compression stage (since condensation occurs). Analyzing the cycle under isothermal compression conditions can also simplify the analysis; other compression conditions can change the result of the analysis. The convention used here for the algebraic sign of work is that positive work is done on the working fluid and negative work is done by the fluid. Accordingly, negative work can be extracted from the system and positive work must be provided to the system.

The dry air behaves as an ideal gas throughout the compression process so the compression work done on the dry air is given by equation 11.

$$w_{air} = -\int_{v_i}^{v_f} p_{air} dv =$$

$$-\int_{v_i}^{v_f} \frac{m_{air} RT}{v} dv = p_{i,air} v_i \ln\left(\frac{v_i}{v_f}\right) = (p_i - \phi p_{sat}) v_i \ln\left(\frac{v_i}{v_f}\right)$$

11

The work done on the water vapor can be evaluated in two stages. The vapor behaves as an ideal gas until condensation begins. The first stage of the work resembles that of the dry air except for the upper limit on the integral, and is given in equation 12.

$$w_{vap1} = -\int_{v_i}^{\phi v_i} p_{vap} dv = -\int_{v_i}^{\phi v_i} \frac{m_{vap} RT}{v} dv = -\phi p_{sat} v_i \ln(\phi)$$

12

Once condensation starts, the partial pressure exerted by the vapor is the saturation pressure at the constant temperature, so the work required is as in equation 13.

$$w_{vap2} = -\int_{\phi v_i}^{v_2} p_{sat} dv = p_{sat}(\phi v_i - v_f)$$

13

The total compression work is the sum of equations 11, 12, and 13, shown simplified in equation 14.

$$w_{comp} = p_i v_i \ln\left(\frac{v_i}{v_f}\right) + \phi p_{sat} v_i \left(1 - \ln\left(\frac{\phi v_i}{v_f}\right)\right) - p_{sat} v_f$$

14

The work analysis will assume that the condensation process is adiabatic. Specifics on how to approach this ideal will be discussed later. As the water condenses, it liberates its heat of vaporization to the dry air, raising the temperature of the dry air. The temperature rise is given by equation 15.

$$\Delta T = \lambda_w \frac{h_v}{C_p} = 2300 \lambda_w^\circ \, C.$$

15

In equation 15 $h_v$ is the heat of vaporization of water and $C_p$ is the specific heat of dry air. Since both of these are constant, the expression can be evaluated as a function of the mass ratio of condensed water alone. Typical values of $\lambda_w$ are on the order of 0.005–0.01, so a temperature rise of 10–20° C. is typical. Rising temperature increases the saturation pressure of the water vapor, so less water will be condensed and the temperature rise will be smaller than predicted above. In practice, the temperature of air after condensation will be the adiabatic saturation temperature. The estimate above is sufficient for the discussion that follows.

At this point in the cycle the condensate can be removed from the chamber, leaving warm dry air. The air can then be expanded isothermally to the original volume. The mass undergoing expansion is the mass of the dry air plus the mass of uncondensed water vapor. The expansion behaves as an ideal gas; the expansion work is given by equation 16.

$$W_{exp} = -\int_{v_f}^{v_i} \frac{m_{air} R(T+\Delta T)}{v} dv - \int_{v_f}^{v_i} \frac{v_f p_{sat}(T+\Delta T)}{v} dv =$$

$$-\left[(p_i - \phi p_{sat}(T)) v_i \frac{T+\Delta T}{T} + v_f p_{sat}(T+\Delta T)\right] \ln\left(\frac{v_i}{v_f}\right)$$

16

The total work done over the cycle is the sum of the compression and expansion work, given by equation 17.

$$W_{cycle} = -v_i \left[ \ln \rho \left[ (p_i - \phi p_{sat}(T)) \frac{\Delta T}{T} + \frac{p_{sat}(T+\Delta T)}{\rho} \right] - \phi p_{sat}(T)(1 - \ln \phi) + \frac{p_{sat}(T)}{\rho} \right]$$

17

Applying the above equations to a specific example can help illustrate the potential of the present invention. For example conditions of 25 degrees C. and 40 percent humidity, the work extracted is 1.3 MJ/kg of water extracted. The total compression work is 33 MJ/kg of water. Since the extracted work is 4% of the total compression work, it is possible to extract water from the atmosphere at the example conditions with no additional required energy (assuming a compressor with 96% or greater efficiency). Conventional compressors are typically 85–95% efficient. The additional energy required accordingly can be relatively small. The operating numbers are dependent on the ambient temperature and humidity: at 30 degrees C. and 50 percent humidity, the required compressor efficiency is only 93%.

The example conditions above reflect typical daytime temperature and humidity. The present invention can be even more efficient at night. Specific humidity tends to remain substantially constant, while lower evening and nighttime temperatures reduce the saturation pressure of the water vapor. For example, if in the example conditions the temperature drops 10 degrees C. while specific humidity remains constant, the relative humidity rises to 75%. The new conditions allow water to be extracted at much lower compression ratios, requiring less total work.

Example Apparatus

Figure 4:
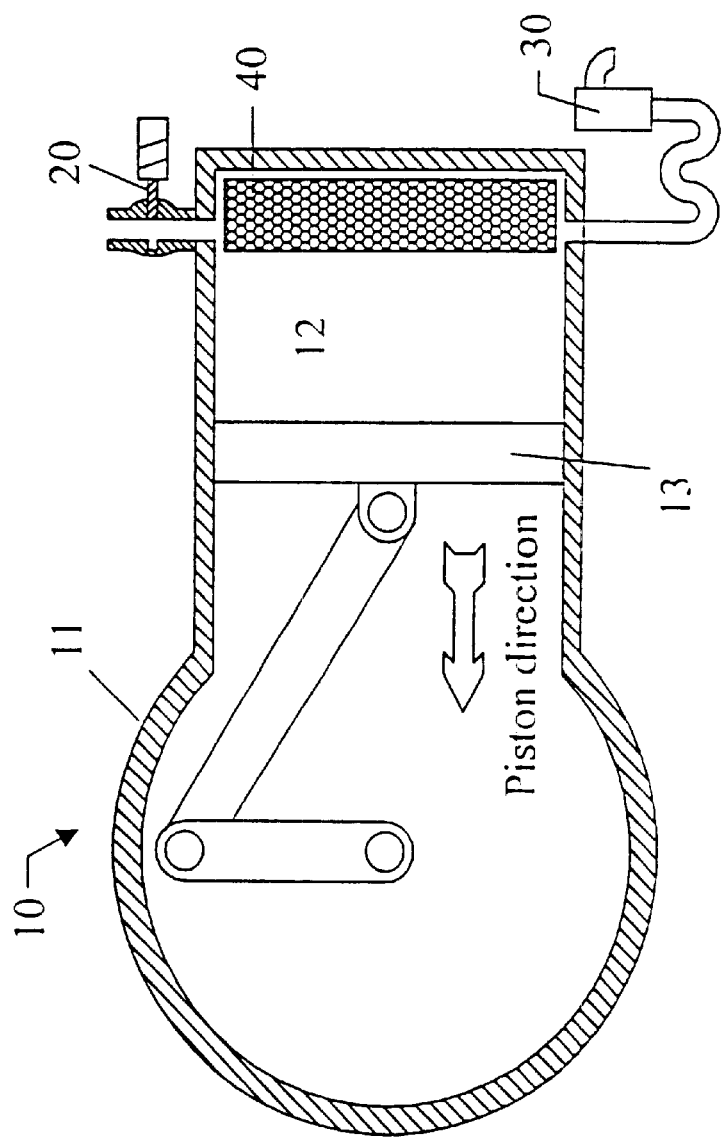
FIG. 4 is a schematic representation of an apparatus according to the present invention.
Figure 5A:
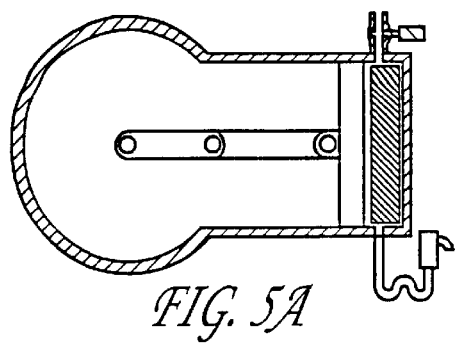
FIGS. 5($a,b,c,d,e,f,g,h$) are schematic representations of the mechanical cycle of the apparatus, illustrated at the end and the midway position of each of four strokes.
Figure 5E:
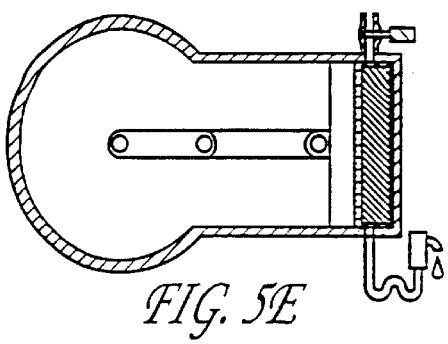
Figure 5B:
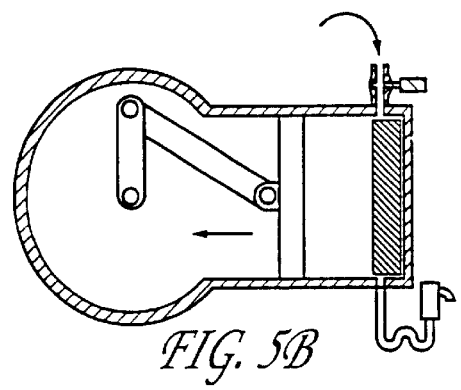
Figure 5F:
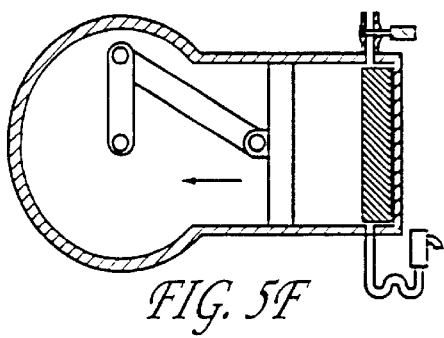
Figure 5C:
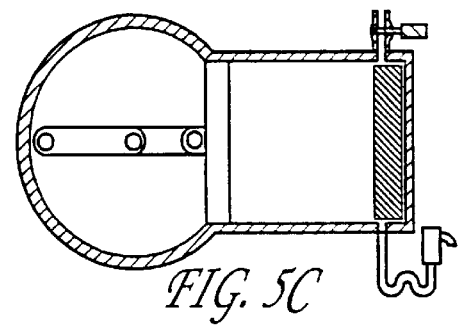
Figure 5G:
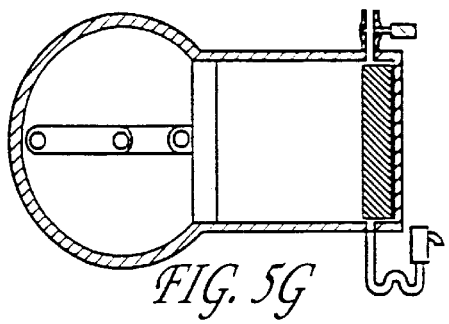
Figure 5D:
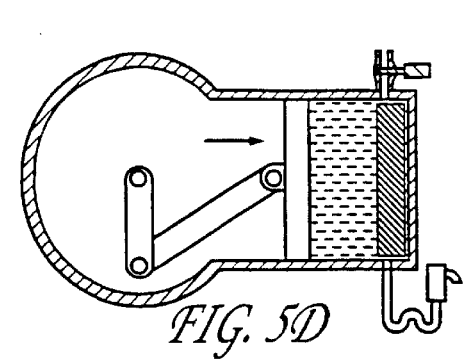
Figure 5H:
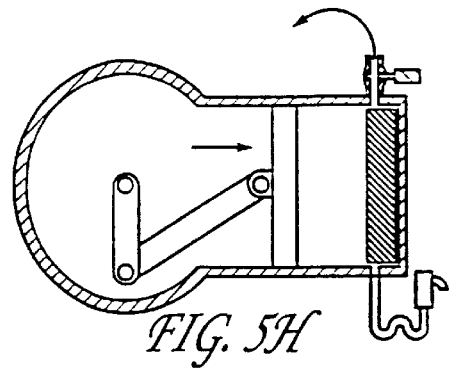

An example apparatus is similar to a conventional four stroke internal combustion engine. The apparatus, shown schematically in FIG. 4, comprises a compressor 10, an intake/exhaust valve 20, a relief valve 30, and a condensation medium 40. In the example apparatus the compressor 10 comprises a body 11 defining a compression chamber 12 with a piston 13 movable relative to the body 11 and varying the volume of the compression chamber 12.

FIGS. 5(*a,b,c,d,e,f,g,h*) show the mechanical cycle of the apparatus, illustrated at the end and the midway position of each of the four strokes. Beginning with the beginning of the intake stroke shown in FIG. 5*a*, the enclosed volume is at the minimum and the intake/exhaust valve is open. The piston moves to enlarge the chamber volume, drawing moist air into the compression chamber, as in FIG. 5*b*. At the end of the intake stroke, FIG. 5*c*, the intake/exhaust valve closes and the compression stroke begins. The piston moves to reduce the chamber volume, FIG. 5*d*, compressing the moist air and condensing water vapor. By the end of the compression stroke, FIG. 5*e*, the water vapor has condensed into liquid water, which is removed from the chamber. The action of condensation transfers heat to the remaining dry air and the warm dry air is expanded, FIG. 5*f*. At the end of the expansion stroke, FIG. 5*g*, the intake/exhaust valve is opened and the exhaust stroke, FIG. 5*h*, begins, pushing warm dry air from the compression chamber. The cycle then repeats.

Figure 6:
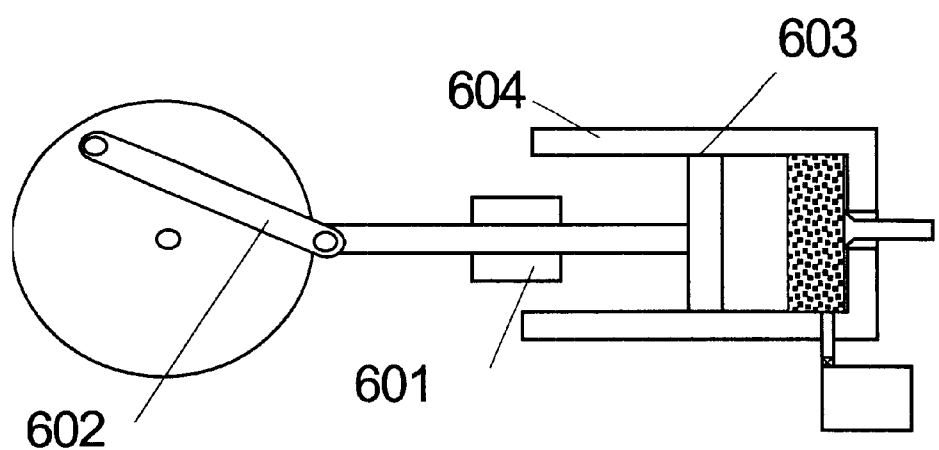
FIG. 6 is a schematic representation of an apparatus according to the present invention.

FIG. 5 illustrates a single cylinder compressor; multiple cylinders can allow a compression stroke in one chamber to be offset by an expansion stroke in another chamber. Combining extraction cylinders with internal combustion cylinders can simplify the addition of energy, if required. Automotive eight cylinder engines have been modified to make high capacity compressors by converting some of the internal combustion cylinders to compression cylinders. Piston rings and journal bearing friction in a conventional internal combustion cylinder can reduce the efficiency of water extraction if internal combustion cylinders are used unmodified as compression cylinders. Modification for greater efficiency as a compression cylinder is possible; the absence of combustion products and high temperatures can allow lower friction designs and materials. Suitably low temperature swings can allow a lapped piston to wall seal, eliminating friction due to piston ring sealing. Sideload on the piston can also generate efficiency-reducing friction. An antifriction bearing can be used between the piston and a crank connecting rod as shown in FIG. 6. Linear bearing 601 bears the sideload from the motion of connecting rod 602, reducing friction between piston 603 and walls 604.

The example apparatus can provide a compression regime suitable for condensation. Temperature elevation increases the saturation pressure of the water vapor, reducing the amount of vapor condensed. At the extreme, strict adiabatic compression can result in temperature increases of 350 degrees C. at a compression ratio of 7.0. This corresponds to a vapor pressure of about 150 bars, making it doubtful that any condensation can be achieved unless the apparatus provides for cooling subsequent to compression. Fortunately, the thermal mass of the air is low relative to the surroundings, and compression can be achieved at modest increases in temperature. Tests have shown that a temperature gradient from the compressed air to a condensation region within the apparatus can encourage condensation. The condensation region can be a portion of the volume occupied by the air kept cooler than the rest, surfaces of the apparatus that are cooler than the air, or a condensation medium designed for appropriate heat transfer to maintain a temperature gradient.

A condensation medium such as a sponge can provide thermal mass to discourage temperature elevation. Additionally, the sponge can be adapted to provide heat transfer appropriate for maintaining a temperature differential. The condensation medium's properties can be tailored to accommodate the desired heat transfer and the desired compression speed. A porous structure such as a sponge can facilitate rapid heat transfer, allowing short cycle times. For example, the condensation medium can comprise a sponge, with mean pore size of over 1 millimeter.

The water's surface tension can also pose a barrier to condensation. Nucleation sites can encourage condensation by reducing the effect of the surface tension barrier. For example, smoke or fog in the compression chamber can provide nucleation sites. The condensation medium can also provide nucleation sites. A sponge having hydrophilic surfaces can provide a large surface area for water to condense. The large surface area, however, can allow excessive evaporation during expansion. Accordingly, a sponge with only selected portions made hydrophilic can reduce the evaporation surface area and can encourage condensation in advantageous portions of the chamber (e.g., near water removal ports).

Heat transfer that is recovered on expansion does not unduly reduce the efficiency. Unrecovered heat transfer, however, reduces the efficiency. In the example apparatus, heat can transfer from the air to the cylinder walls and be lost to the surroundings, reducing the overall efficiency. Insulating the cylinder walls can mitigate this loss, for example by using a double wall cylinder with a vacuum between the walls.

Scavenging of the condensed water is also important to the operation of the apparatus. The fog generated by compression must not be allowed to significantly evaporate when the air is expanded. As the fog begins to condense, it collects into large droplets due to the surface tension of the water. The large droplets have a lower surface to volume ratio that the initial fog and consequently evaporate slowly on expansion. Accordingly, the expansion is not necessarily an equilibrium process. Accomplishing the expansion in a relatively short time can prevent significant evaporation of condensate. A volume of liquid water in the compression chamber or as part of a condensation medium can serve as a scavenging device by providing an even lower surface to volume ratio.

A simple relief valve can be used to retrieve condensate from the chamber. As condensate accumulates in the chamber, the peak pressure increases (due to reduced chamber volume). A relief valve, coupled with a trap (e.g., like traps in conventional steam systems) to ensure that only condensate escapes, can vent the condensate from the compression chamber. A filter can also be placed in the exhaust path to trap water that might be lost in the exhaust. A filter made of material such as GORETEX™ can allow water vapor into the chamber and trap liquid water, allowing combination of intake and exhaust paths. Centrifugal force can also help scavenge water. For example, a coiled exhaust path can use exhaust motion to agglomerate water droplets on the tube wall. As another example, spinning the chamber or the condensation medium can move liquid water to the walls of the chamber or the outside of the thermal mass. Also, configuring the inlet or exhaust paths to provide swirling of the air in the chamber or the exhaust path can provide centrifugal force that encourages liquid water to the walls of the chamber or the exhaust path.

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

We claim:

1. A method of extracting water from a quantity of moist air, comprising:
   a) compressing the quantity of moist air non-adiabatically to a relative humidity of substantially 1;
   b) further compressing the quantity of moist air while maintaining a temperature gradient between the moist air and a condensing region, forming condensate in the condensing region;
   c) separating condensate from the remaining air; and
   d) repeating from step a) with a new quantity of moist air.

2. A method of extracting water from a quantity of moist air, comprising:
   a) Compressing the quantity of moist air, while maintaining a temperature gradient between the moist air and a condensing region, to a pressure where the mass of water originally present in the moist air is greater than the mass of water representing a relative humidity of 1 at the compressed condition, wherein some of the excess mass of water forms condensate;
   b) Separating condensate from the remaining air; and
   c) Repeating from step a) with a new quantity of moist air.

3. The method of claim 2, wherein the step of compressing the quantity of moist air comprises removing heat from the quantity of moist air while compressing the quantity of moist air.

4. The method of claim 2, wherein the step of compressing the quantity of moist air comprises reducing the temperature of the quantity of moist air while compressing the quantity of moist air.

5. The method of claim 2, further comprising the step of allowing the remaining air to expand after separating condensate therefrom.

6. The method of claim 5, wherein the step of allowing the remaining air to expand comprises adding heat to the remaining air while allowing the remaining air to expand.

7. The method of claim 5, wherein the step of allowing the remaining air to expand comprises increasing the temperature of the remaining air while allowing the remaining air to expand.

8. The method of claim 3, further comprising the step of adding a portion of the heat removed from the moist air to the remaining air and allowing the remaining air to expand.

9. An apparatus for extraction of water from moist air, comprising:
   a) A body defining a compression chamber having a variable volume and a condensation region in fluid communication with the compression chamber;
   b) An air intake port, in fluid communication with the compression chamber and in fluid communication with a source of moist air;
   c) An air exhaust port, in fluid communication with the compression chamber; and
   d) A condensate removal port, in fluid communication with the compression chamber.

10. The apparatus of claim 9, wherein the body comprises:
    a) Walls defining a cross section extending along an axis;
    b) A piston mounted within the walls, slidable along the axis.

11. The apparatus of claim 9, wherein the condensation region comprises a medium adapted to store heat released from compression and condensation of moist air in the compression chamber and release heat during expansion of air in the compression chamber.

12. The apparatus of claim 11, wherein the medium is adapted to maintain a temperature differential from the air during compression.

13. The apparatus of claim 11, wherein the medium has a heat capacity greater than three times the heat capacity of moist air in the compression chamber.

14. The apparatus of claim 11, wherein the medium comprises a porous structure.

15. The apparatus of claim 14, wherein the porous structure is adapted to maintain a temperature differential from the air during compression.

16. The apparatus of claim 14, wherein the porous structure has a mean pore size greater than 1 millimeter.

17. The apparatus of claim 14, wherein the porous structure comprises a sponge.

18. The apparatus of claim 17, wherein the sponge comprises a portion treated to make it hydrophilic.

19. The apparatus of claim 10, wherein the walls define an insulating space within the walls substantially surrounding the cross section wherein mounts the piston.

20. The apparatus of claim 19, wherein the insulating space is substantially evacuated.

21. The apparatus of claim 9, further comprising a scavenging device adapted to discourage evaporation of liquid water during expansion of the compression chamber.

22. The apparatus of claim 10, wherein the piston and walls are lapped to provide a seal therebetween.

23. The apparatus of claim 10, further comprising:
    a) a crankshaft;
    b) a linear bearing;
    c) a connecting rod having first and second ends, connected to the piston at the first end and to the crankshaft at the second end, and passing through the linear bearing between the first and second ends.

24. The apparatus of claim 9, wherein the air intake port is adapted to impart a swirling motion to moist air entering the chamber.

25. The apparatus of claim 9, wherein the air exhaust port comprises a filter adapted to collect water droplets from air passing through the filter.

26. The apparatus of claim 9, wherein the air exhaust port comprises a coiled passageway.

27. The apparatus of claim 9, wherein the air exhaust port is adapted to impart swirling motion to air passing therethrough.

28. A method of using the apparatus of claim 9 to extract water from moist air, comprising:
    a) Configuring the intake and exhaust ports to allow moist air into the compression chamber, then configuring the intake and exhaust ports to substantially prevent moist air from leaving the compression chamber;
    b) Reducing the volume of the compression chamber to place the moist air in the compression chamber under pressure high enough that the mass of water initially present is more than the mass of water corresponding to a relative humidity of 1;
    c) Increasing the volume of the compression chamber;
    d) Configuring the intake and exhaust ports to allow air to leave the compression chamber, and repeating from step a); and
    e) Periodically removing condensate through the condensation removal port.

29. A method of using the apparatus of claim 9 to extract water from moist air, comprising:
    a) Configuring the intake and exhaust ports to allow moist air into the compression chamber;
    b) Increasing the volume of the compression chamber;

c) Configuring the intake and exhaust ports to substantially prevent moist air from leaving the compression chamber;

d) Reducing the volume of the compression chamber to place the moist air in the compression chamber under pressure high enough that the mass of water initially present is more than the mass of water corresponding to a relative humidity of 1;

e) Increasing the volume of the compression chamber;

f) Configuring the intake and exhaust ports to allow air to leave the compression chamber;

g) Reducing the volume of the compression chamber, and repeating from step a); and h) Periodically removing condensate through the condensation removal port.

* * * * *